United States Patent [19]
Eastman et al.

[11] Patent Number: 5,978,334
[45] Date of Patent: Nov. 2, 1999

[54] SAMPLING TIMING FOR A REFLECTED WRITE SIGNAL

[75] Inventors: Clarke K. Eastman, Rochester, N.Y.; Jeffrey T. Klaus, Lafayette, Colo.

[73] Assignee: Eastman Kodak Company, Rochester, N.Y.

[21] Appl. No.: 08/957,717

[22] Filed: Oct. 24, 1997

[51] Int. Cl.⁶ ...................................................... G11B 7/00
[52] U.S. Cl. ............................ 369/50; 369/59; 369/44.34
[58] Field of Search .................................. 369/59, 47, 48, 369/49, 50, 54, 58, 44.27, 44.28, 44.34, 32; 360/39, 32, 36.1, 36.2, 37.1, 51

[56] References Cited

U.S. PATENT DOCUMENTS

| | | |
|---|---|---|
| 4,599,717 | 7/1986 | Bracht et al. . |
| 4,606,016 | 8/1986 | Verboom et al. . |
| 4,680,594 | 7/1987 | Bracht . |
| 4,933,922 | 6/1990 | Yokogawa ............................ 369/44.34 |
| 4,949,311 | 8/1990 | Barnard . |
| 5,105,413 | 4/1992 | Bakx . |
| 5,126,994 | 6/1992 | Ogawa et al. . |
| 5,216,660 | 6/1993 | Iimura . |
| 5,285,327 | 2/1994 | Hetzler . |
| 5,309,424 | 5/1994 | Ogawa ................................. 369/50 X |
| 5,398,227 | 3/1995 | Miyaoka et al. . |
| 5,406,540 | 4/1995 | Longman et al. . |
| 5,436,880 | 7/1995 | Eastman et al. . |
| 5,440,534 | 8/1995 | Eastman et al. . |
| 5,446,716 | 8/1995 | Eastman et al. . |
| 5,490,127 | 2/1996 | Ohta et al. . |
| 5,495,466 | 2/1996 | Dohmeier et al. . |
| 5,561,645 | 10/1996 | Eastman et al. . |

Primary Examiner—Muhammad Edun
Attorney, Agent, or Firm—Pamela R. Crocker

[57] ABSTRACT

A method for adjusting the timing for sampling a reflected write signal is disclosed. The method comprises determining a reference timing event, and sampling the reflected write signal at first and second sampling times to produce first and second sampled signals, the first sampling time occurring after a first variable time delay following the reference timing event and the second sampling time occurring after a first fixed time delay following the first sampling time. The method further comprises comparing the magnitudes of the first and second sampled signals, and adjusting the first variable time delay in response to the comparison of the magnitudes of the first and second sampled signals so that the magnitudes of the first and second sampled signals are substantially equal.

10 Claims, 10 Drawing Sheets

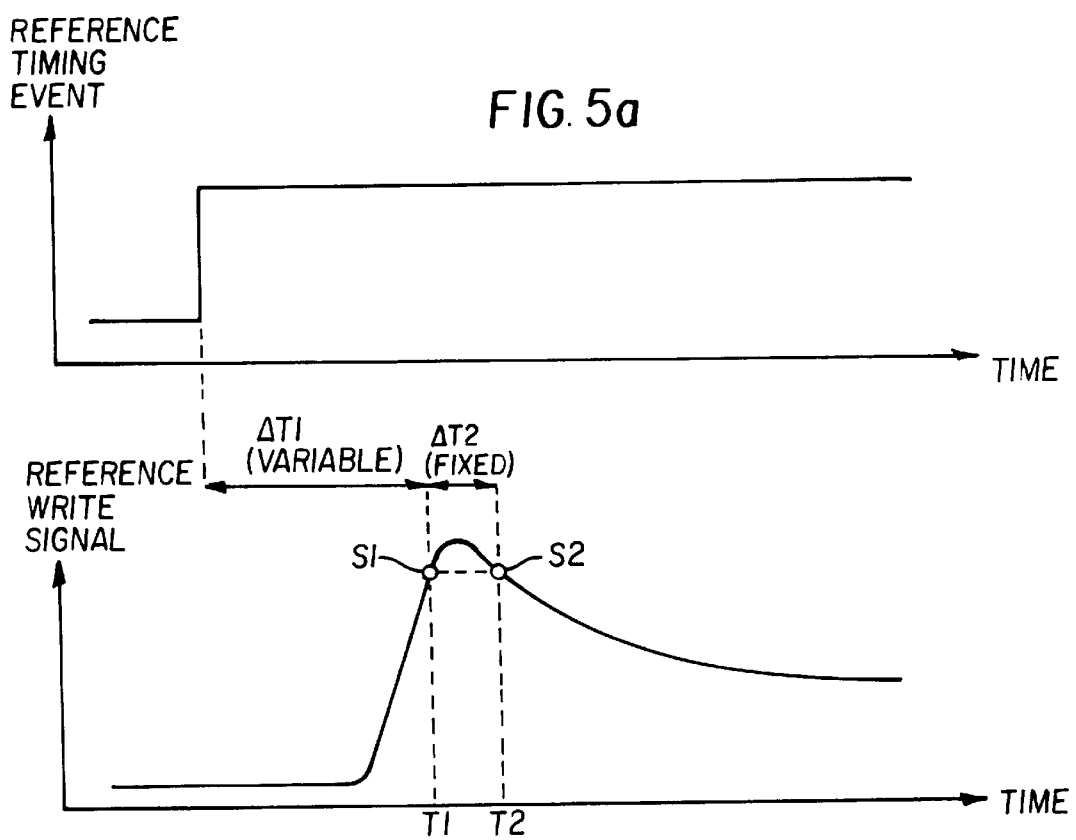

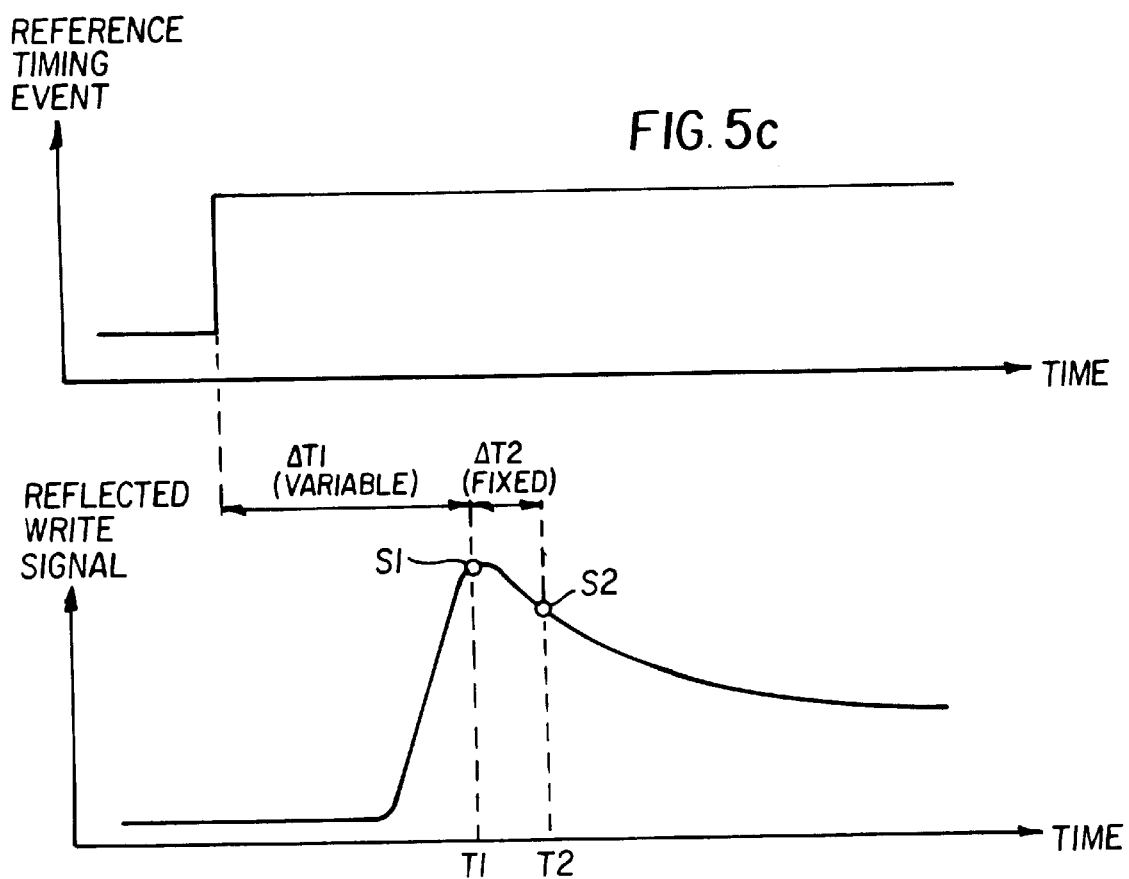

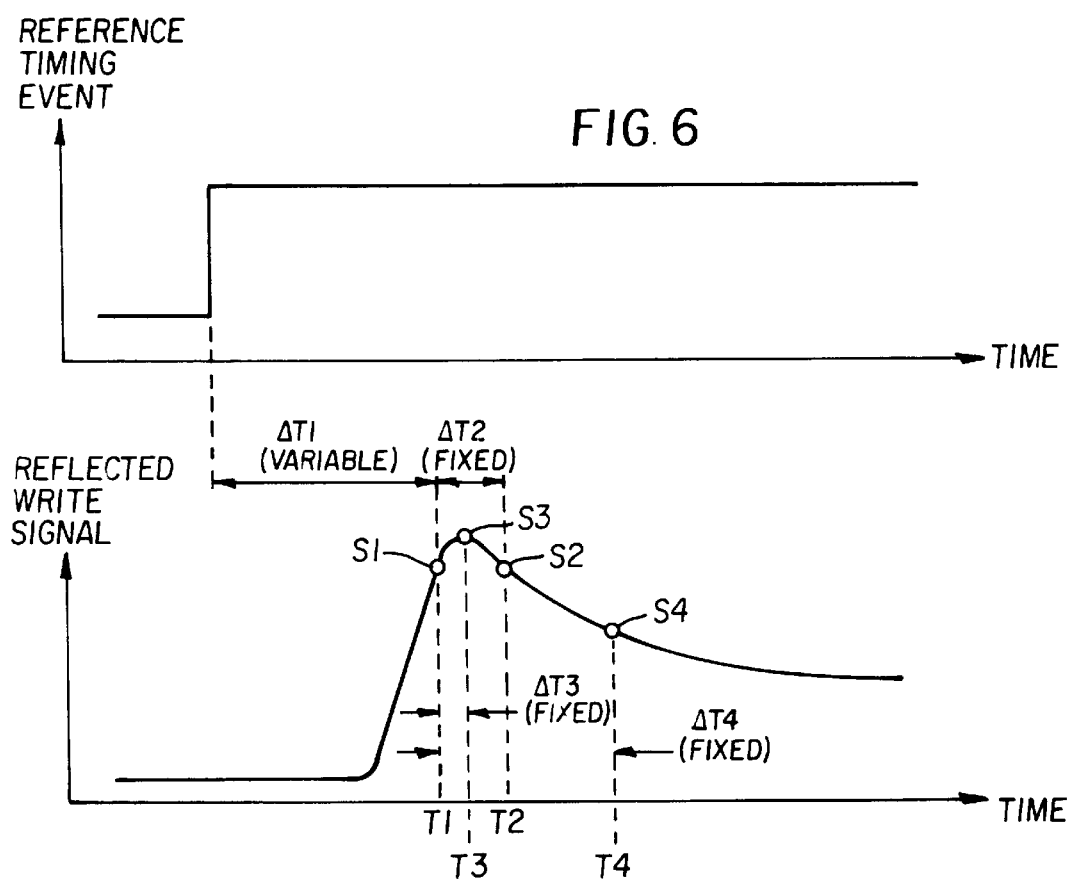

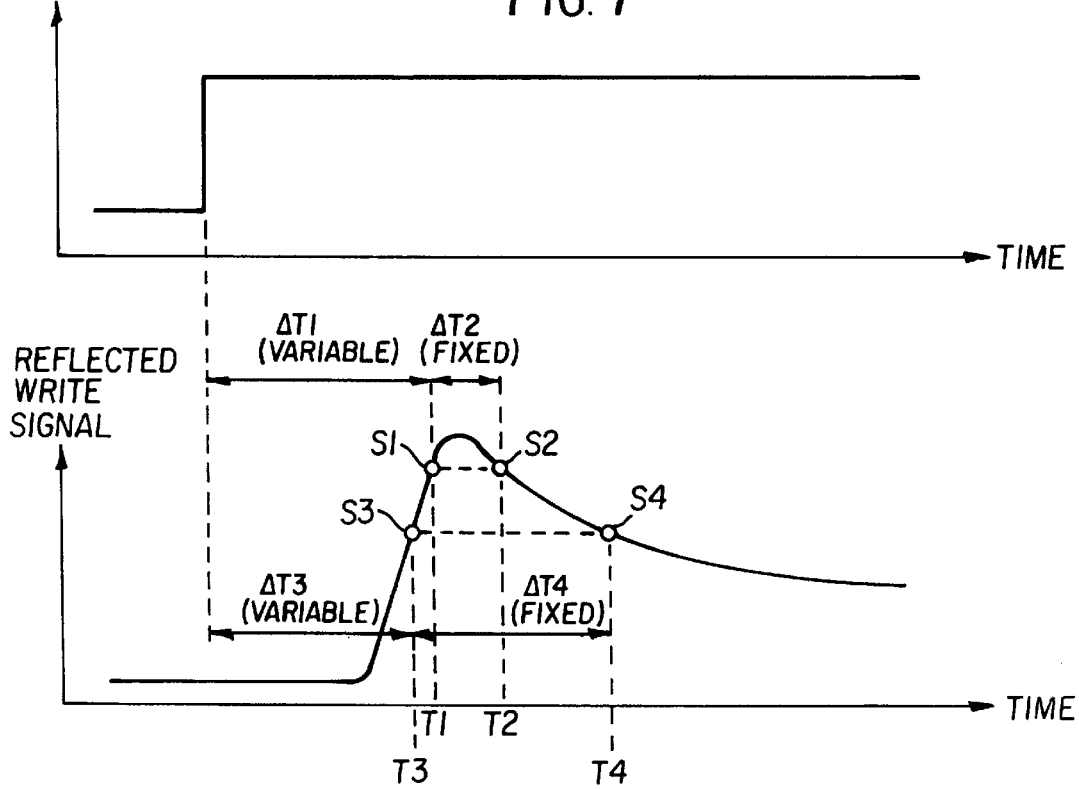
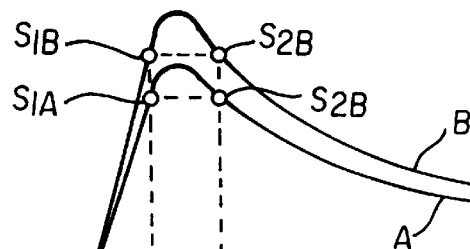
FIG. 8

SAMPLING TIMING FOR A REFLECTED
WRITE SIGNAL

FIELD OF THE INVENTION

The present invention relates to optical data recording, and in particular, to providing accurate sampling of a reflected write signal relative to a reference timing event.

BACKGROUND OF THE INVENTION

A method for measuring mark formation effectiveness by sampling a reflected write signal at two instances in time $T_1$ and $T_2$ relative to an external reference timing event is described in U.S. Pat. No. 5,216,660 to Iimura, and is illustrated in FIG. 1. Such a reference timing event can be, for example, the rising edge of a write pulse sent to a recording laser. As shown in FIG. 1, the method disclosed in U.S. Pat. No. 5,216,660 uses fixed, predetermined delays $T_1$ and $T_2$ between the reference timing event and the times that the reflected write signal is sampled. However, there are many sources of uncertainty and variation in the actual time delay between such a reference timing event and the reflected write signal. For example, the time delay can vary from one device to another and with time and temperature for a given device. Nonadjustable sampling delays between the reference timing event and the reflected write signal may be adequate for very low data recording rates such as "1X" speed in a CD recordable ("CD-R") system, where a given sample timing error may not cause significant error in the resulting measurement. However, as data recording rates increase, that same error in sample timing can lead to larger errors when attempting to measure a specific feature of the reflected write signal, such as its peak value. This is illustrated in FIG. 2, which is a graph of reflected write signals at 1X and 8X CD-R data rates, where X is the data rate associated with CD audio playback (i.e., 4.321 Mbits per second data rate recorded to or read back from the disk). As shown in FIG. 2, a sampling timing error of 15 nanoseconds causes a sampled measurement error at 6X, which is significantly greater than at 1X.

A mark formation effectiveness measurement method described in commonly-assigned U.S. Pat. No. 5,495,466, to Dohmeier et al., the disclosure of which is herein incorporated by reference, effectively solves this timing error problem for a reflected write signal which has a well defined peak. Such a signal occurs, for example, with CD-R media. Rather than sampling the reflected write signal, this method works by dynamically adjusting one or more threshold levels relative to the reflected write signal. Each threshold level is adjusted until the reflected write signal exceeds that threshold for a predetermined time period. Referring to FIG. 3, a graph of a reflected write signal versus time is shown which illustrates the mark formation effectiveness measurement method disclosed in U.S. Pat. No. 5,495,466. In FIG. 3, the threshold level $V_1$ is adjusted so that the reflected write signal exceeds it for a predetermined time period $\Delta T_1$. Similarly, the threshold level $V_2$ is adjusted so that the reflected write signal exceeds it for a predetermined time period $\Delta T_2$. Mark formation effectiveness measurements can be made by processing the threshold levels $V_1$ and $V_2$, which is described in more detail in U.S. Pat. No. 5,495,466. This method accomplishes accurate mark formation effectiveness measurements without needing to provide the precise sample timing of the reflected write signal, as required by U.S. Pat. No. 5,216,660. However, one of the limitations of the method described in U.S. Pat. No. 5,495,466 is its speed of response. Since the threshold levels are dynamically adjusted, the threshold levels do not instantaneously follow changes in the reflected write signal. This time lag can be a problem, for example, when measuring rapid waveform fluctuations such as occur at the wobble frequency of CD-R.

SUMMARY OF THE INVENTION

Accordingly, it is an object of the present invention to provide an improved mark formation effectiveness measurement of a reflected write signal which responds quickly to changes in the reflected write signal.

It is another object of the present invention to provide an improved mark formation effectiveness measurement of a reflected write signal which is insensitive to uncertainty and variation of a reference timing event.

These objects are achieved by a method for adjusting the sampling time of a reflected write signal, comprising the steps of:

(a) determining a reference timing event;

(b) sampling the reflected write signal at first and second sampling times to produce first and second sampled signals, the first sampling time occurring after a first variable time delay following the reference timing event and the second sampling time occurring after a first fixed time delay following the first sampling time;

(c) comparing the magnitudes of the first and second sampled signals; and (d) adjusting the first variable time delay in response to the comparison of the magnitudes of the first and second sampled signals so that the magnitudes of the first and second sampled signals are substantially equal.

ADVANTAGES

An advantage of the present invention is to provide accurate sampling of a reflected write signal despite uncertainty and variation in the reference timing event.

Another advantage of the present invention is to provide an improved mark formation effectiveness measurement of a reflected write signal which responds quickly to changes in the reflected write signal.

BRIEF DESCRIPTION OF THE DRAWINGS

FIGS. 5A–5C are graphs of a reflected write signal versus time illustrating adjustment of sampling timing in accordance with the present invention;

FIG. 6 is a graph of a reflected write signal versus time illustrating a first embodiment of mark formation effectiveness measurement in accordance with the present invention;

FIG. 7 is a graph of a reflected write signal versus time illustrating a second embodiment of mark formation effectiveness measurement in accordance with the present invention;

FIG. 8 is a graph of two reflected write signals versus time illustrating the decreased response time of signal measurement in accordance with the present invention.

DETAILED DESCRIPTION OF THE INVENTION

Figure 4:
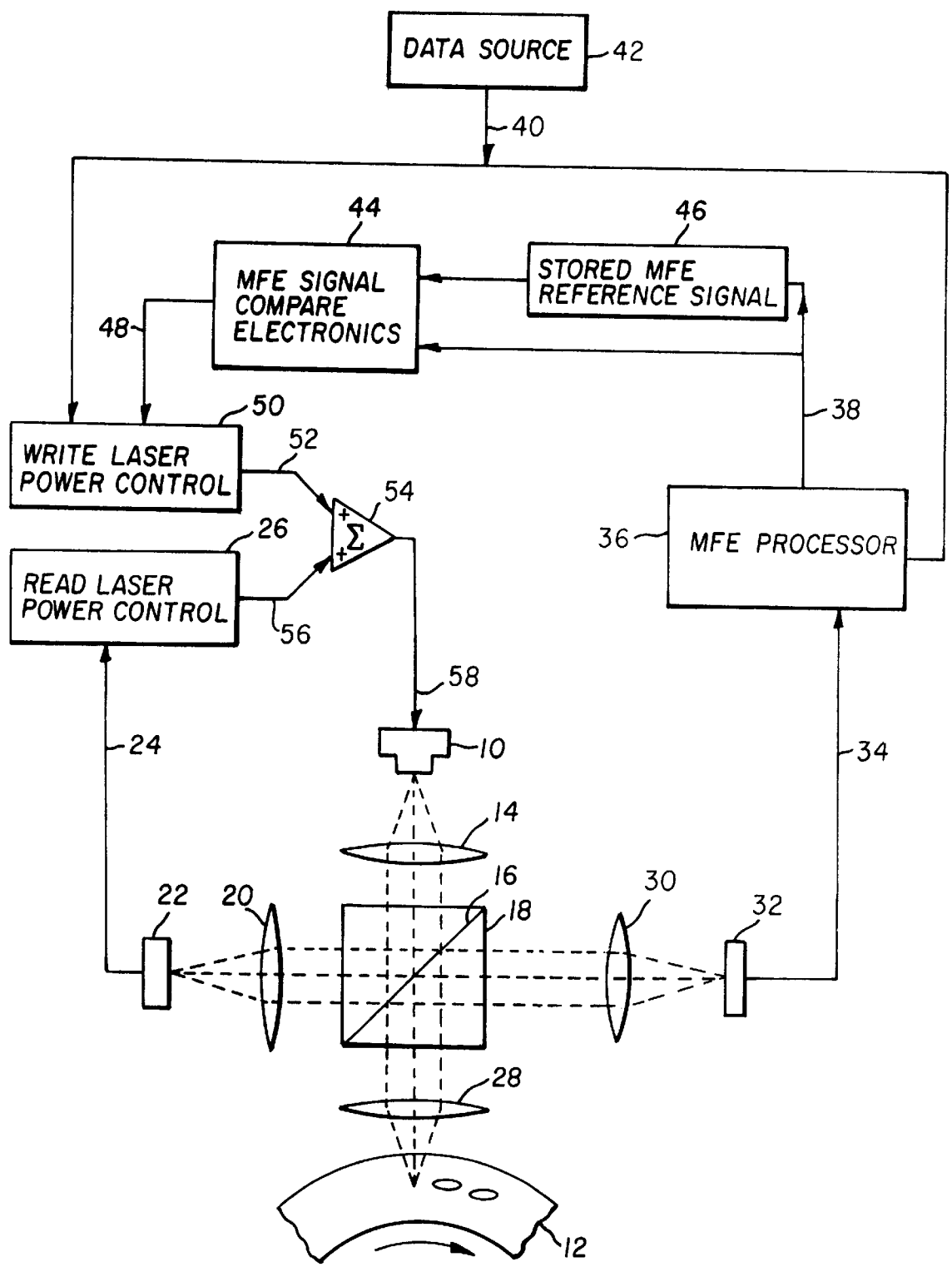
FIG. 4 is a schematic diagram partially in block form of a representative recording apparatus which can be operated in accordance with the present invention.

Referring to FIG. 4, a representative recording apparatus which can be operated in accordance with the present invention is shown. As shown in FIG. 4, an incident radiation beam is produced by an optical source 10 for recording marks on an optical recording medium 12. The optical source 10 can include, for example, a laser or a laser diode and a controller, and will be referred to hereinafter as a laser. It should be understood, however, that the techniques of the present invention can be used with other types of optical sources. The recording medium 12 typically includes data tracks (not shown) arranged in spiral or concentric circles on a data storage surface (not shown).

The radiation beam from the laser 10 is collimated by a lens 14 and directed to surface 16 of a beam splitter 18. A portion of the collimated light beam is reflected by the surface 16 of the beam splitter 18 toward a detector focusing lens 20 and thereby focused onto a front facet detector 22. The front facet detector 22 produces a front facet (FF) signal 24 from the incident beam. The FF signal 24 is used in a read laser power control circuit 26 to maintain the output power level of the laser 10 at a desired value during reading of the data or between recording pulses in a manner well known in the art.

Referring again to FIG. 4, the portion of the light beam which is not reflected by surface 16 of the beam splitter 18 to the front facet detector 22 is transmitted through surface 16 to an objective lens 28 which focuses the light beam onto the recording medium 12. By modifying the power level of the incident beam, data in the form of marks are recorded on the recording medium 12.

Interaction of the incident beam with the recording medium 12 causes a portion of the incident beam to be reflected. The reflected beam, referred to hereinafter as a return beam, is recollimated by the objective lens 28. A portion of the return beam is reflected by surface 16 of the beam splitter 18 to a data focusing lens 30 which focuses the return beam onto a detector 32.

Detector 32 produces a reflected write signals 34 which represents light received into the return beam aperture. Focus and tracking signals are also typically generated in the return path. A number of methods are well known to those skilled in the art and are not shown.

The reflected write signal 34 is applied to a mark formation effectiveness (MFE) processor 36. The MFE processor 36 processes the reflected write signal 34 to produce a mark formation effectiveness (MFE) signal 38 indicative of some aspect of mark formation quality, such as the resulting mark length, in a manner to be discussed in greater detail below. The timing aspects of the processing of the reflected write signal 34 are controlled by a pulsed signal 40 produced by a data source 42, in a manner to be discussed in more detail below. Using MFE signal comparison electronics 44, the MFE signal 38 is then compared to an optimum, or previously stored reference, value of an MFE signal which was previously determined during calibration. The previously determined MFE reference signal 46 can be stored, for example, in a portion of a recording system memory (not shown). The storage and retrieval of the MFE reference signal 46 can be controlled, for example, by a recording system processor (not shown).

Deviation of the processed MFE signal 38 from the stored MFE reference signal 46 is indicative of improper mark formation on the optical recording medium 12. MFE signal comparison electronics 44 then produces a write laser control signal 48 in response to the processed MFE signal 38 and the stored MFE reference signal 46. The write laser control signal 48 is applied to a write laser power control circuit 50 during actual data recording. The data source 42 produces a pulsed signal 40 which is also applied to the write laser power control circuit 50 to modulate the instantaneous output power of the laser 10 in response to the data to be recorded. The write laser power control circuit 50 produces a write laser power adjustment signal 52 which consists of a series of data pulses. The data pulses are produced in response to the pulsed signal 40 from the data source 42 and have an amplitude controlled by the write laser control signal 48. A summing amplifier 54 combines the write laser power adjustment signal 52 with a read laser power control signal 56 produced by the read laser power control circuit 26 to produce a combined laser power control signal 58. The combined laser power control signal 58 is applied to the laser 10 to adjust the power during both reading and recording of data.

Figure 5B:
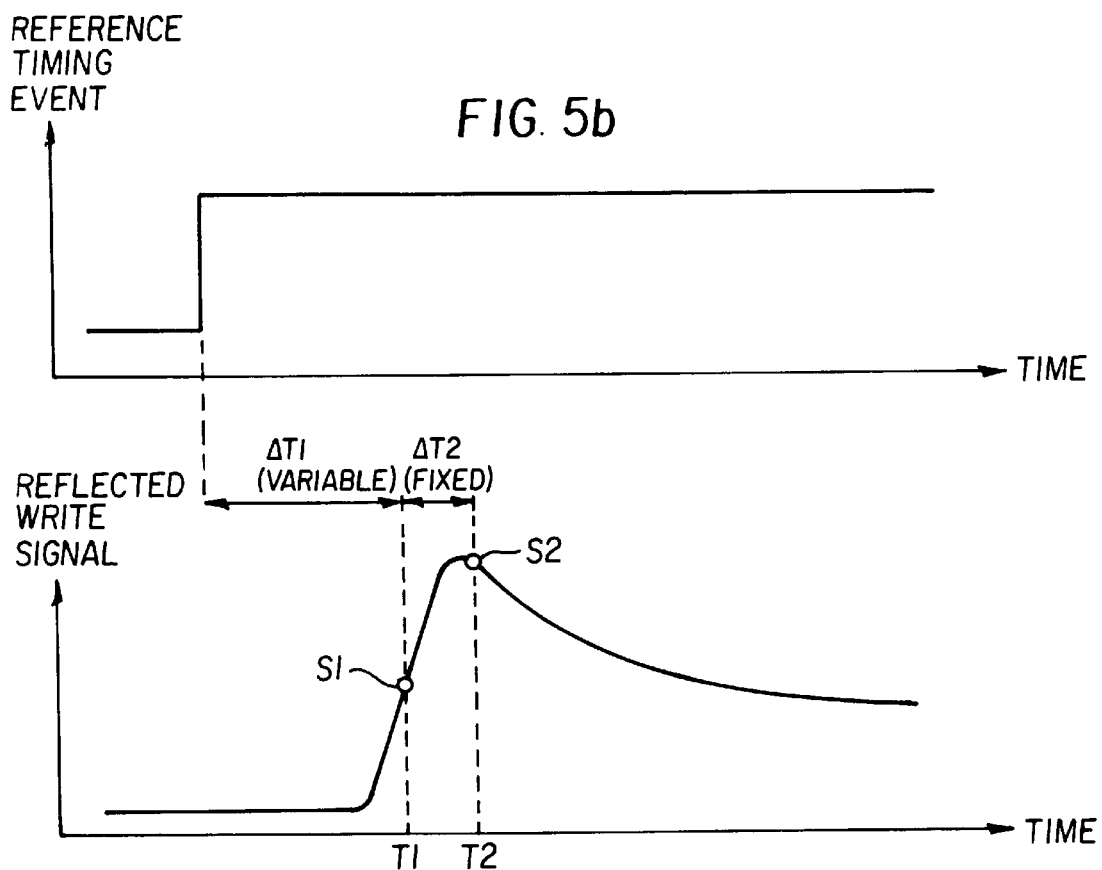

The generation of the MFE signal 38 will now be discussed. To accurately generate the MFE signal 38, it is desirable to sample the reflected write signal 34 at one or more sampling times which have a consistent timing relationship relative to the timing of the peak magnitude of the reflected write signal 34. FIGS. 5A–5C are graphs of the reflected write signal 34 versus time illustrating adjustment of sampling timing relative to the timing of the peak magnitude of the reflected write signal 34 in accordance with the present invention. The pulsed signal 40 produced by the data source 42 is applied to the MFE processor 36 (shown in FIG. 4) and is used as a reference timing event to sample the reflected write signal 34. As shown in FIGS. 5A–5C, the reflected write signal 34 is sampled at a first sampling time $T_1$ to produce a first sampled signal $S_1$. $T_1$ occurs after a first variable time delay $\Delta T_1$ following the reference timing event. The reflected write signal 34 is then sampled at a second sampling time $T_2$ to produce a second sampled signal $S_2$. $T_2$ occurs after a fixed time delay $\Delta T_2$ following $T_1$. The magnitudes of $S_1$ and $S_2$ are used to determine the timing of $T_1$ and $T_2$ relative to the timing of the peak magnitude of the reflected write signal 34.

As shown in FIG. 5A, the magnitude of $S_1$ is substantially equal to the magnitude of $S_2$. The magnitude of $S_1$ being substantially equal to the magnitude of $S_2$ places $T_1$ before and $T_2$ after the timing of the peak magnitude of the reflected write signal 34. At this desired placement, $T_1$ and $T_2$ effectively straddle the timing of the peak magnitude of the reflected write signal 34. By maintaining $S_1$ substantially equal to $S_2$, $T_1$ and $T_2$ are maintained in a consistent relationship relative to the timing of the peak magnitude of the reflected write signal 34. This results in consistent measurements of the reflected write signal 34.

In FIG. 5B, the magnitude of $S_1$ is less than the magnitude of $S_2$. This indicates that the variable time delay $\Delta T_1$ is too short, placing $T_1$ and $T_2$ earlier than desired. In this case, $\Delta T_1$ should be increased until the magnitude of $S_1$ is substantially equal to the magnitude of $S_2$ to achieve the consistent timing relationship of the sampled signals relative to the peak magnitude of the reflected write signal 34. Conversely, as shown in FIG. 5C, the magnitude of $S_1$ is greater than the magnitude of $S_2$, indicating that the variable time delay $\Delta T_1$ is too long, placing $T_1$ and $T_2$ later than desired. In this case, $\Delta T_1$ should be decreased until the magnitude of $S_1$ is substantially equal to the magnitude of $S_2$ to achieve the consistent timing relationship of the sampled signals relative to the peak magnitude of the reflected write signal 34. In contrast to the present invention, the method disclosed in U.S. Pat. No. 5,216,660 uses a fixed delay between the reference timing event and one or more sampling times. With fixed delays, any changes in the timing between the reference timing event and the timing of the peak magnitude of the reflected write signal 34 will result in inconsistent sampling relative to the timing of the peak magnitude of the reflected write signal 34. These sampling timing errors will result in inaccurate mark formation effectiveness measurements.

FIGS. 6–9 show various embodiments of using sampling timing adjustment strategy shown in FIGS. 5A–5C to measure mark formation effectiveness. FIG. 6 is a graph of the reflected write signal 34 versus time illustrating a first embodiment of mark formation effectiveness measurement in accordance with the present invention. As shown in FIG. 6, the reflected write signal 34 is sampled at a first sampled time $T_1$, which occurs after a first variable time delay $\Delta T_1$ following a reference timing event, to produce a first sampled signal $S_1$. The reflected write signal 34 is then sampled at a second sampled time $T_2$, which occurs after a first fixed time delay $\Delta T_2$ following the first sampling time $T_1$, to produce a second sampled signal $S_2$. The magnitudes of $S_1$ and $S_2$ are compared, and $\Delta T_1$ is adjusted until the magnitudes of $S_1$ and $S_2$ are substantially equal in a manner previously described in connection with FIGS. 5A–5C. The reflected write signal 34 is also sampled at a third sampled time $T_3$, which occurs after a second variable time delay $\Delta T_3$ following the sampled time $T_1$, to produce a third sampled signal $S_3$. In accordance with the present invention, $\Delta T_3$ is less than $\Delta T_2$. As discussed above, $T_1$ and $T_2$ effectively straddle the peak magnitude of the reflected write signal 34, and therefore, as shown in FIG. 6, $S_3$ sampled at time $T_3$ is substantially equal to the peak magnitude of the reflected write signal 34. The reflected write signal 34 is also sampled at a fourth sampled time $T_4$, which occurs after the third fixed time delay $\Delta T_4$ following sampled time $T_1$, to produce a fourth sampled signal $S_4$. In accordance with the present invention, $\Delta T_4$ is greater than $\Delta T_3$ so that the reflected write signal 34 is sampled at a consistent time following the timing of the peak magnitude. The MFE signal 38 is produced by comparing the magnitudes of $S_3$ and $S_4$. For example, the MFE signal 38 can be produced by taking the ratio of $S_3$ and $S_4$. The magnitudes of $S_3$ and $S_4$ can be compared in various other ways to produce the MFE signal 38 in a manner well known to those skilled in the art. Examples of various comparison means are more fully described in U.S. Pat. No. 5,495,466. It should be noted that although this embodiment includes sampling the reflected write signal 34 at two sampling times $T_3$ and $T_4$ to measure mark formation effectiveness, mark formation effectiveness can be measured using additional sampling times.

This first embodiment, as shown in FIG. 6, provides an advantage over the prior art method disclosed in U.S. Pat. No. 5,216,660 in that it provides sampling timing which adapts to changes in the timing of the reference timing event relative to the timing of the peak magnitude of the reflected write signal 34. Such timing changes can occur, for example, because of temperature changes or because of manufacturing tolerances. As a result, measurements in accordance with the present invention are made at consistent times relative to the timing of the peak magnitude of the reflected write signal 34.

FIG. 7 is a graph of the reflected write signal 34 versus time illustrating a second embodiment of mark formation effectiveness measurement in accordance with the present invention. As shown in FIG. 7, the reflected write signal 34 is sampled at a first sampled time $T_1$, which occurs after a first variable time delay $\Delta T_1$ following a reference timing event, to produce a first sampled signal $S_1$. The reflected write signal 34 is then sampled at a second sampled time $T_2$, which occurs after a first fixed time delay $\Delta T_2$ following the first sampling time $T_1$, to produce a second sampled signal $S_2$. The magnitudes of $S_1$ and $S_2$ are compared, and $\Delta T_1$ is adjusted until the magnitudes of $S_1$ and $S_2$ are substantially equal in a manner previously described in connection with FIGS. 5A–5C. The reflected write signal 34 is also sampled at a third sampled time $T_3$, which occurs after a second variable time delay $\Delta T_3$ following the reference timing event, to produce a third sampled signal $S_3$. The reflected write signal 34 is also sampled at a fourth sampled time $T_4$, which occurs after the second fixed time delay $\Delta T_4$ following sampled time $T_3$, to produce a fourth sampled signal $S_4$. The magnitudes of $S_3$ and $S_4$ are compared, and $\Delta T_3$ is adjusted until the magnitudes of $S_3$ and $S_4$ are substantially equal in a manner previously described in connection with FIGS. 5A–5C. The MFE signal 38 is produced in response to at least one of the first and second sampled signals $S_1$ and $S_2$, and at least one of the third and fourth sampled signals $S_3$ and $S_4$ after adjustment of the first variable time delay $\Delta T_1$ and the second variable time delay $\Delta T_3$. For example, the MFE signal 38 can be produced by taking the ratio of $S_2$ and $S_4$, or the ratio of $(S_1+S_2)$ and $(S_3+S_4)$. Various other comparison means can be used to produce the MFE signal 38 in a manner well known to those skilled in the art. It should be noted that although this embodiment includes sampling the reflected write signal 34 at two pairs of sampling times, $T_1$ and $T_2$, and $T_3$ and $T_4$, to measure mark formation effectiveness, mark formation effectiveness can be measured using additional sampling times or pairs of sampling times.

Figure 1:
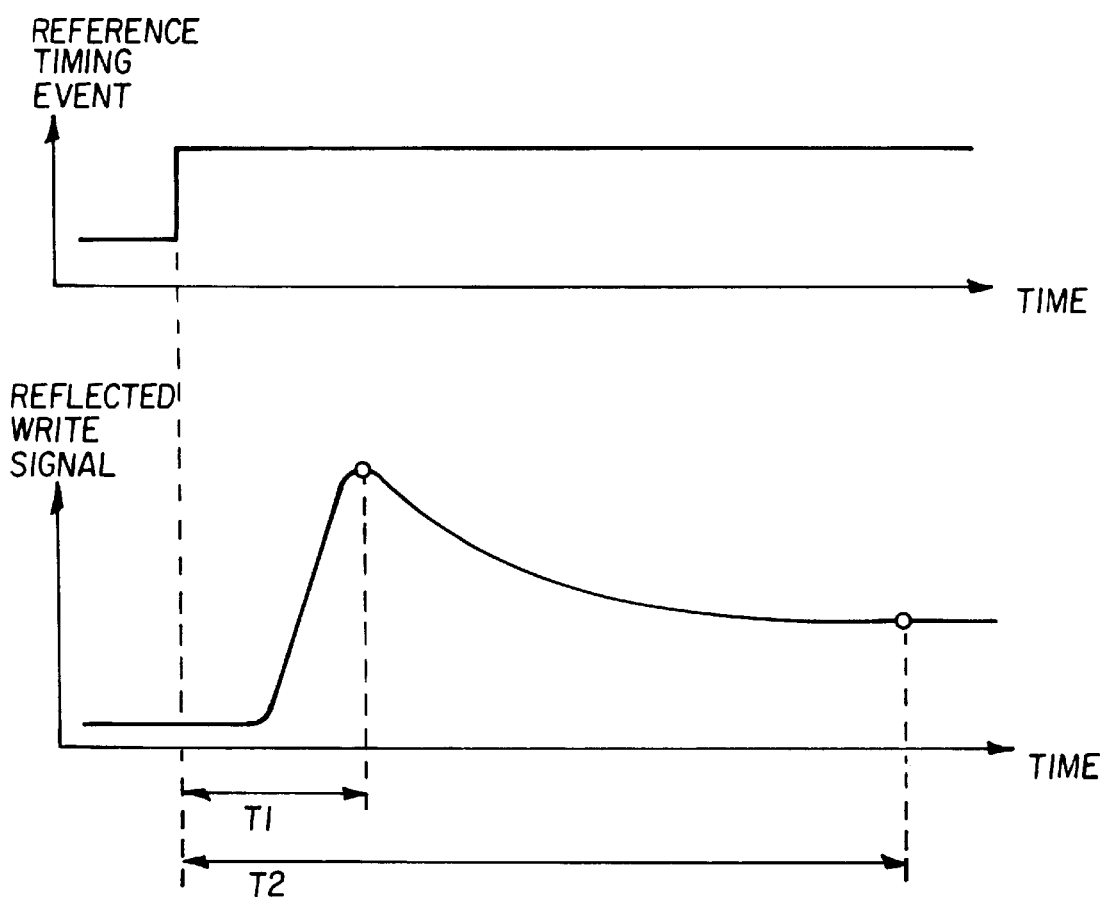
FIG. 1 is a graph of a reflected write signal and a reference timing event versus time illustrating a prior art method of measuring mark formation effectiveness.
Figure 2:
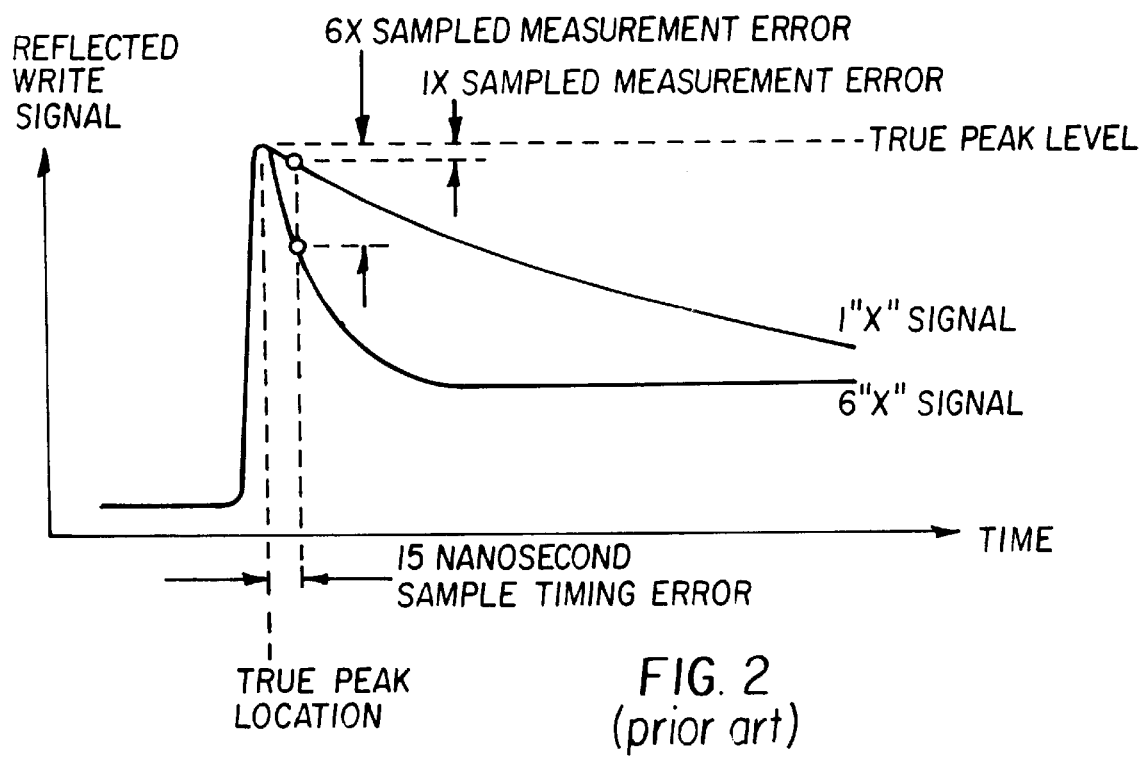
FIG. 2 is a prior art graph of reflected write signals versus time at 1X and 8X CD-R data rates illustrating signal measurement errors as a result of sampling timing errors.
Figure 3:
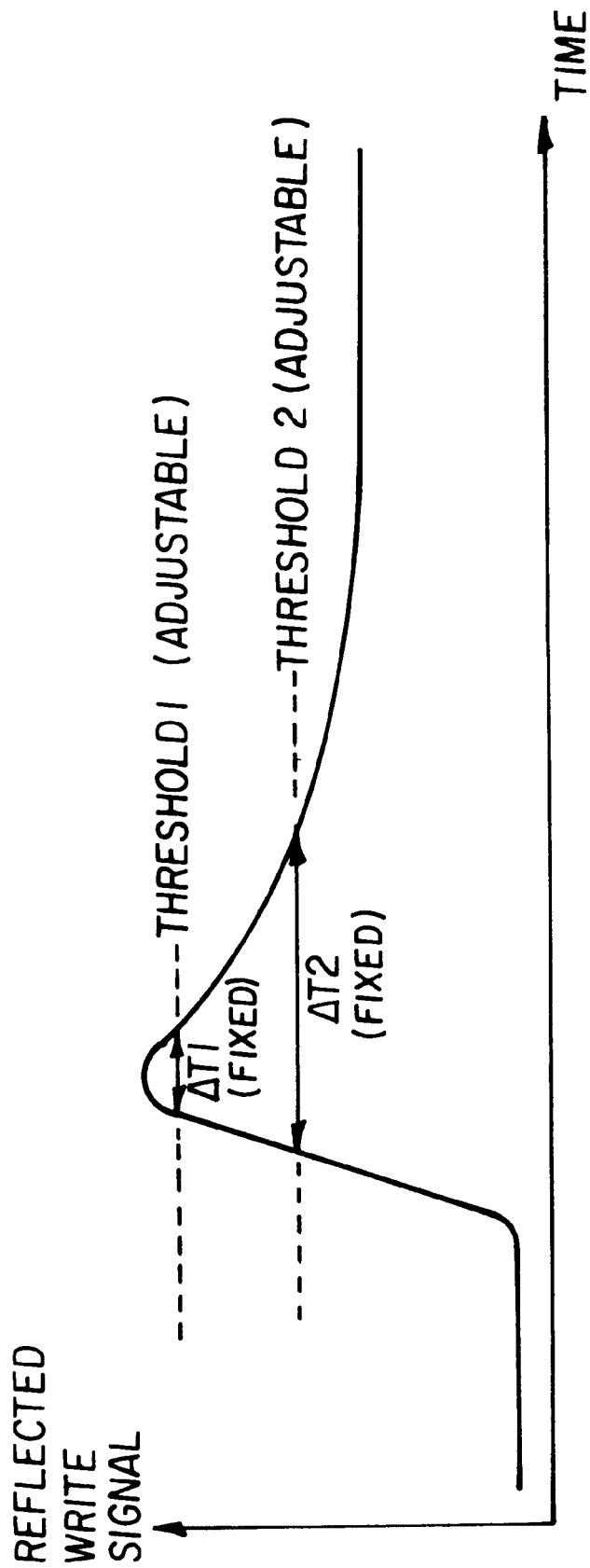
FIG. 3 is a graph of a reflected write signal versus time illustrating a prior art method of measuring mark formation effectiveness.

It should be also noted that the methods illustrated in FIGS. 6 and 7 in accordance with the present invention also provide the advantage over the method disclosed in U.S. Pat. No. 5,495,466 in that the MFE signal 38 responds more quickly to changes in the reflected write signal 34. One example of this decreased response time is shown in FIG. 8, which is a graph of the reflected write signal 34 during two reflected write pulses versus time. In this example, the reflected write signal 34 during a reflected write pulse B has a higher peak level than during a reflected write pulse A. As shown in FIG. 8, sampling times $T_1$ and $T_2$ have been established in a manner previously described in conjunction with FIGS. 5A–5C. During pulse A, the sampled signals taken at sampling times $T_1$ and $T_2$ are designated $S_{1A}$ and $S_{2A}$, respectively. For pulse B, the sampled signals taken at sampling times $T_1$ and $T_2$ are designated $S_{1B}$ and $S_{2B}$, respectively. If pulse A is immediately followed by pulse B, the sampled signals $S_1$ and $S_2$ will change directly from $S_{1A}$ to $S_{1B}$ and from $S_{2A}$ to $S_{2B}$. In contrast to the present invention in which the reflected write signal is sampled at two sampling times separated by a fixed time interval, the prior art method disclosed in U.S. Pat. No. 5,495,466 (shown in FIG. 3) works by dynamically adjusting a threshold level relative to the reflected write signal until the peak portion of the reflected write signal exceeds that threshold for a fixed time interval. With the Dohmeier method, if pulse A is immediately followed by pulse B, the threshold level would gradually change from the level of $S_{1A}$ and $S_{1B}$ to the level of $S_{2A}$ and $S_{2B}$, rather than directly change as in the present invention. This gradual change results in a longer response time, which is a problem, for example, when measuring rapid fluctuations in the reflected write signal such as occur at the wobble frequency of CD-R.

Figure 9:
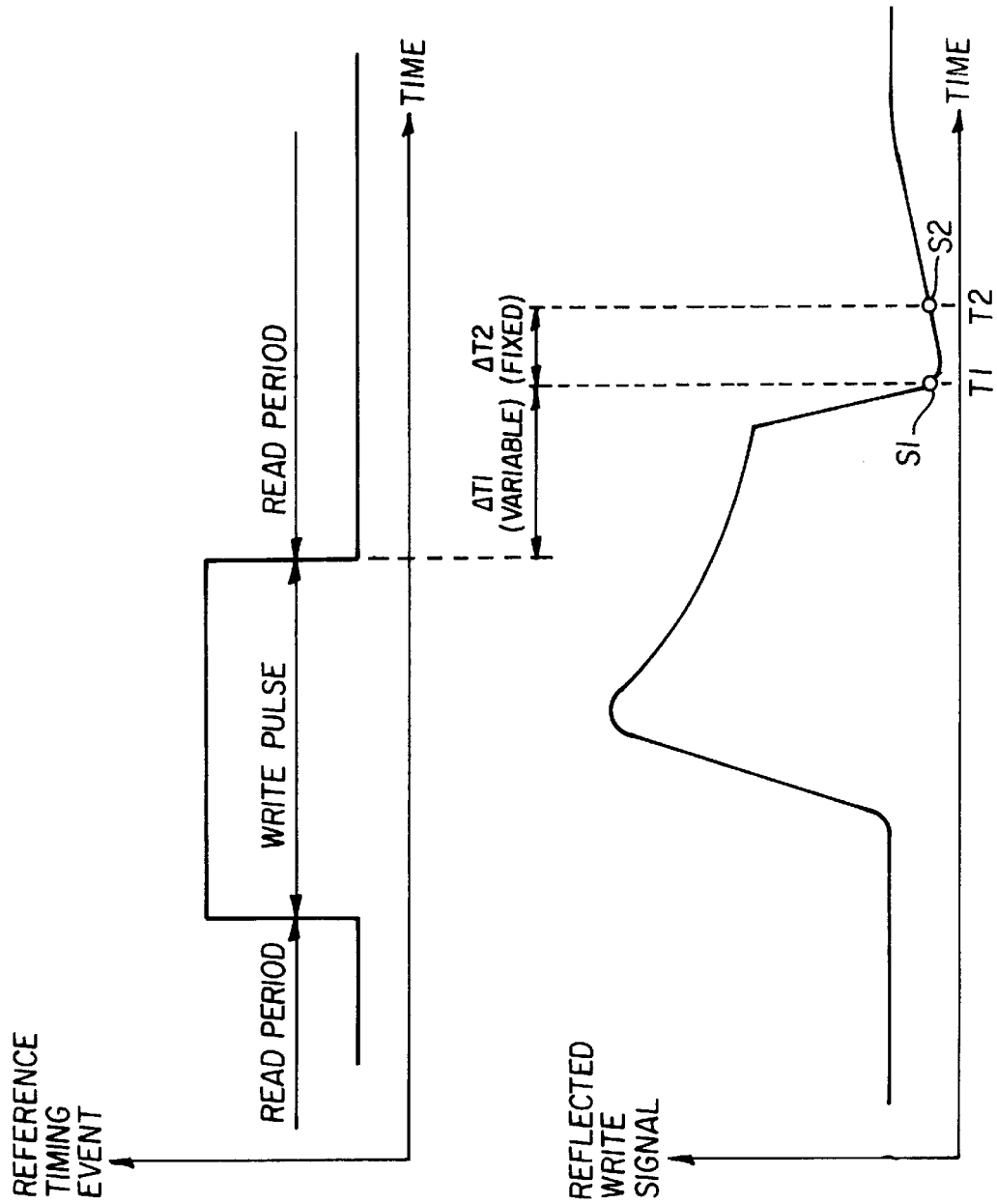
FIG. 9 is a graph of a reflected write signal versus time illustrating a signal measurement made immediately following a write pulse in accordance with the present invention.

It would be understood by one skilled in the art that the sampling timing strategy described above can be applied to measurements of a reflected write signal made immediately following a write pulse. This is shown in FIG. 9, where a first sampling time $T_1$ occurs after a variable time delay $\Delta T_1$ following a reference timing event associated with the end of a write pulse. A second sampling time $T_2$ occurs after a fixed time delay $\Delta T_2$ after the first sampling time $T_1$. $\Delta T_1$ is adjusted so that the magnitude of a first sampled signal $S_1$ taken at $T_1$ is substantially equal to the magnitude of a second sampled signal $S_2$ taken at $T_2$. The magnitude of $S_1$ being substantially equal to the magnitude of $S_2$ places $T_1$ before and $T_2$ after the timing of the minimum magnitude of the reflected write signal 34 following a write pulse. At this desired placement, $T_1$ and $T_2$ effectively straddle the timing of the minimum magnitude of the reflected write signal 34. By maintaining $S_1$ substantially equal to $S_2$, $T_1$ and $T_2$ are maintained in a consistent relationship relative to the timing of the minimum magnitude of the reflected write signal 34. This results in consistent measurements of the reflected write signal 34. In adjusting the variable time delay $\Delta T_1$, if the magnitude of $S_1$ is less than the magnitude of $S_2$, $\Delta T_1$ should be decreased until the magnitude of $S_1$ is substantially equal to the magnitude of $S_2$ to achieve the consistent timing relationship of the sampled signals relative to the minimum magnitude of the reflected write signal 34. Conversely, if the magnitude of $S_1$ is greater than the magnitude of $S_2$, $\Delta T_1$ should be increased until the magnitude of $S_1$ is substantially equal to the magnitude of $S_2$. The techniques used to measure mark formation effectiveness which were previously described for sampling during a write pulse also apply to mark formation effectiveness measurements when the sampling occurs after a write pulse, as shown in FIG. 9.

The invention has been described in detail with particular reference to certain preferred embodiments thereof, but it will be understood that variations and modifications can be effected within the spirit and scope of the invention.

PARTS LIST

| | |
|---|---|
| 10 | optical source |
| 12 | recording medium |
| 14 | lens |
| 16 | surface of beam splitter |
| 18 | beam splitter |
| 20 | detector focusing lens |
| 22 | front facet detector |
| 24 | front facet signal |
| 26 | read laser power control circuit |
| 28 | objective lens |
| 30 | data focusing lens |
| 32 | detector |
| 34 | reflected write signal |
| 36 | mark formation effectiveness processor |
| 38 | mark formation effectiveness signal |
| 40 | pulsed signal |
| 42 | data source |
| 44 | mark formation effectiveness signal comparison electronics |
| 46 | stored mark formation effectiveness reference signal |
| 48 | write laser control signal |
| 50 | write laser power control circuit |
| 52 | write laser power adjustment signal |
| 54 | summing amplifier |
| 56 | read laser power control signal |
| 58 | combined laser power control signal |

What is claimed is:

1. A method for adjusting the sampling time of a reflected write signal, comprising the steps of:

(a) determining a reference timing event;
   (b) sampling the reflected write signal at first and second sampling times to produce first and second sampled signals, the first sampling time occurring after a first variable time delay following the reference timing event and the second sampling time occurring after a first fixed time delay following the first sampling time;
   (c) comparing the magnitudes of the first and second sampled signals; and
   (d) adjusting the first variable time delay in response to the comparison of the magnitudes of the first and second sampled signals so that the magnitudes of the first and second sampled signals are substantially equal.

2. The method of claim 1 wherein the adjustment step further includes increasing the variable time delay when the magnitude of the first sampled signal is smaller than the magnitude of the second sampled signal, and decreasing the variable time delay when the magnitude of the first sampled signal is greater than the magnitude of the second sampled signal.

3. The method of claim 1 further including the steps of:
   (e) sampling the reflected write signal after a second fixed time delay following the first sampling time to produce a third sampled reflected write signal;
   (f) sampling the reflected write signal after a third fixed time delay following the first sampling to produce a fourth reflected write signal; and
   (g) comparing the magnitudes of the third and fourth sampled write signals to thereby produce a mark formation effectiveness signal.

4. The method of claim 1 further including the steps of:
   (e) sampling the reflected write signal at third and fourth sampling times to produce third and fourth sampled signals, the third sampling time occurring after a second variable time delay following the reference timing event and the fourth sampling time occurring after a second fixed time delay following the third sampling time;
   (f) comparing the magnitudes of the third and fourth sampled signals;
   (g) adjusting the second variable time delay in response to the comparison of the magnitudes of the third and fourth sampled signals so that the magnitudes of the third and fourth sampled signals are substantially equal; and
   (h) producing a mark formation effectiveness signal in response to at least one of the first and second sampled signals, and at least one of the third and fourth sampled signals after adjustment of the first and second variable time delays.

5. The method of claim 4 wherein the mark formation effectiveness signal producing step is responsive to the first, second, third, and fourth sampled signals.

6. A method for producing a mark formation effectiveness signal during recording, comprising the steps of:
   (a) determining a reference timing event;
   (b) sampling a reflected write signal at first and second sampling times to produce first and second sampled signals, respectively, the first sampling time occurring after a first variable time delay following the reference timing event and the second sampling time occurring after a first fixed time delay following the first sampling time, and adjusting the first variable time delay in response to the first and second sampled signals so that the magnitudes of the first and second sampled signals are substantially equal;

(c) sampling the reflected write signal at third and fourth sampling times to produce third and fourth sampled signals, respectively, the third sampling time occurring after a second fixed time delay following the first sampling time and the fourth sampling time occurring after a third fixed time delay following the first sampling time, and the second fixed time delay being less than the first fixed time delay, and the third fixed time delay being greater than the second fixed time delay;

(d) producing a mark formation effectiveness signal in response to the second and fourth sampled signals after adjustment of the first variable time delay.

7. The method of claim 6 wherein the adjustment step further includes increasing the first variable time delay when the magnitude of the first sampled signal is smaller than the magnitude of the second sampled signal, and decreasing the first variable time delay when the magnitude of the first sampled signal is greater than the magnitude of the second sampled signal.

8. A method for producing a mark formation effectiveness signal during recording, comprising the steps of:

(a) determining a reference timing event;

(b) sampling a reflected write signal at first and second sampling times to produce first and second sampled signals, the first sampling time occurring after a first variable time delay following the reference timing event and the second sampling time occurring after a first fixed time delay following the first sampling time;

(c) comparing the magnitudes of the first and second sampled signals;

(d) adjusting the first variable time delay in response to the comparison of the magnitudes of the first and second sampled signals so that the magnitudes of the first and second sampled signals are substantially equal;

(e) sampling the reflected write signal at third and fourth sampling times to produce third and fourth sampled signals, the third sampling time occurring after a second variable time delay following the reference timing event and the fourth sampling time occurring after a second fixed time delay following the third sampling time;

(f) comparing the magnitudes of the third and fourth sampled signals;

(g) adjusting the second variable time delay in response to the comparison of the magnitudes of the third and fourth sampled signals so that the magnitudes of the third and fourth sampled signals are substantially equal; and (h) producing a mark formation effectiveness signal in response to at least one of the first and second sampled signals, and at least one of the third and fourth sampled signals after adjustment of the first and second variable time delays.

9. The method of claim 8 wherein the mark formation effectiveness signal producing step is responsive to the first, second, third, and fourth sampled signals.

10. The method of claim 8 wherein the adjustment step further includes increasing the first variable time delay when the magnitude of the first sampled signal is smaller than the magnitude of the second sampled signal and decreasing the variable time delay when the magnitude of the first sampled signal is greater than the magnitude of the second sampled signal, and increasing the second variable time delay when the magnitude of the third sampled signal is smaller than the magnitude of the fourth sampled signal and decreasing the second variable time delay when the magnitude of the third sampled signal is greater than the magnitude of the fourth sampled signal.

* * * * *